United States Patent Office 3,836,645
Patented Sept. 17, 1974

3,836,645
ANTI-VIRAL COMPOSITIONS CONTAINING
3-DEAZA NUCLEOSIDES
Richard L. Tolman, Costa Mesa, and Robert W. Sidwell, Irvine, Calif., assignors to ICN Pharmaceuticals, Inc., Irvine, Calif.
No Drawing. Filed June 23, 1972, Ser. No. 265,482
Int. Cl. A61k 13/00, 27/00
U.S. Cl. 424—180         19 Claims

ABSTRACT OF THE DISCLOSURE

The use of 3-deazacytidine and 3-deazauridine as anti-viral agents is disclosed. Such compounds have demonstrated significant ability to inhibit the development of RNA viruses.

BACKGROUND OF THE INVENTION

This invention relates generally as indicated to 3-deaza nucleosides which are useful as anti-viral agents.

During the past decade, many nucleoside analogs have been found to exhibit good anti-tumor and anti-viral activities. Among the presently known synthetic nucleosidic anti-viral agents, the more important generally are considered to be 5'-iodo-2'-deoxyuridine (IDU) 9-β-D-arabinofuranosyl adenine (Ara-A) and 1-β-D-arabinofuranosyl cytosine (Ara-C). Of these compounds, however, only IDU is commercially available specifically as an anti-viral agent, and this compound is highly toxic, has extremely low solubility, and is ineffective against Rhino viruses, which are regarded as one of the major causes of the common cold. Ara-A is presently undergoing clinical testing as an anti-viral agent and although the reported evidence suggests that it is effective against a spectrum of herpes virus infections, it is not effective against Rhino viruses, and, moreover, its utility is severely limited by its low solubility, a maximum of about 1 microgram/milliliter. By the same token, Ara-C is not effective against Rhino viruses.

When nucleosidic analogs are used to inhibit either viral or tumor growth, the nucleosides are *in vivo* metabolized to their corresponding mono or poly phosphates, which are the actual inhibitors. The major obstacle in the use of nucleoside analogs in chemotherapy, however, is the emergence of cellular resistance to such compounds, as the invaded cells exhibit a low level of kinase or pyrophosphorylase activity and consequently do not produce effective inhibitors.

In view of the foregoing, it is clearly desirable to have nucleosidic analogs which are capable of effectively inhibiting the development of virus infections and which also possess superior solubility than presently known anti-viral agents. The production of such compounds, however, is exceedingly difficult, since relatively few nucleosidic compounds are known which have demonstrated even slight anti-viral activity. Moreover, to provide a compound not only having acceptable activity but which is also capable of penetrating the cellular membrane and contacting the virus infection in effective concentrations, complicates the problem many times over.

SUMMARY OF THE INVENTION

The present invention thus relates to nucleoside analogs which are effective against a variety of RNA virus infections. Such compounds are of the structure:

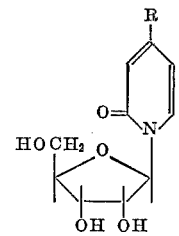

wherein R is OH or $NH_2$ and also to acylated derivatives thereof.

DETAILED DESCRIPTION OF THE INVENTION

The compounds to which the present invention is directed may be prepared by the following procedure in which an appropriately substituted 2,4-substituted pyridine is condensed with 2,3,5-tri-O-benzoyl-D-ribofuranosyl bromide. Upon deblocking, as with alcoholic ammonia or methanolic sodium methoxide, the desired 3-deazapyrimidine nucleoside is produced. If 3-deazauridine is desired (R is OH), 2,4-bis(trimethyl silyloxy) pyridine is used as the starting material, whereas 4-acetamido-2-methoxypyridine will be used to produce 3-deazacytidine (R is $NH_2$). In the preparation of 3-deazacytidine, the condensation product is 4-acetamido-1-(2,3,5-tri-O-benzoyl-β-D-ribofuranosyl)-2-pyridone which, if treated with alcoholic ammonia, yields 4-acetamido-1-β-D-ribofuranosyl-2-pyridone. This latter compound may then be treated with aqueous base, as for example, aqueous methanol, to provide 3-deazacytidine. Alternatively, we have found that the condensation product may be treated with sodium methoxide in methanol at ambient temperature and atmospheric pressure to produce 3-deazacytidine in a single step.

Blocking agents, other than 2,3,5-tri-O-benzoyl-D-ribofuranosyl bromide, of course, may be used if desired, including acetyl, toloyl, etc. since the procedure for preparing such 3-deazapyrimidine nucleosides is known (*Journal of Heterocyclic Chemistry* 7, 323 (1970), Curie et al.; "The Snythesis of 3-Deazapyrimidine Nucleosides Related to Uridine and Cytidine and Their Derivatives," the disclosure of which is incorporated by reference herein), no additional or more detailed description thereof is required herein.

In general, the acylated derivatives will be formed by either glycosylation of the pyrimidine derivative or by acylating deazauridine or deazacytidine with an acyl halide in the manner known to those skilled in the art. The acyl group or groups will contain from 1 to 20 carbon atoms, preferably from 1 to 8 carbon atoms, and are preferably acetyl, benzoyl, toloyl, etc. Such compounds may thus be represented as follows:

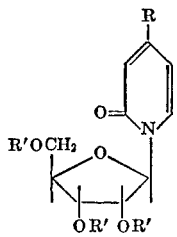

R being OH or $NH_2$ and R' being H or $C_1$ to $C_{20}$ acyl.

When the 3-deazapyrimidine nucleosides are used as anti-viral agents, a quantity of from about 0.001 to about 5% by weight, based on total weight, of the agent will be used in an appropriate diluent, with the actual amount being dependent upon a number of factors, namely, severity of the infection, general health and age of the host, etc. In any event, the actual amount should be sufficient to provide a chemotherapeutically effective amount of the agent to the host in a convenient volume, which will be readily within the ability of those skilled in the art to determine given the disclosure herein.

In one form, the compounds may be used as an aerosol nasal spray, of the type described in U.S. Pat. 3,014,844, the disclosure of which is incorporated by reference herein, containing the indicated quantity of the compound suspended in a liquified propellant such as a lower alkane (up to 5 carbon atoms), a lower alkyl chloride, or a fluorinated or fluorochlorinated lower alkane (available commercially under the trademark, "Freon"). Generally, the propellant is a gas at room temperature and atmospheric pressure, has a boiling point below about 65° F. at atmospheric pressure, and, of course, is non-toxic. Particularly suitable such propellants are dichlorodifluoromethane ("Freon 12"), dichlorotetrafluoroethane ("Freon 14"), and trichloromonofluoromethane ("Freon 11"). When used in the suspension, the 3-deazapyrimidine nucleoside should be finely divided, as for example, smaller than 100 microns diameter, preferably not greater than 25 microns, and more preferably about 0.5 to about 4 microns diameter. It may also be advantageous to include a surface active agent, preferably non-ionic, e.g., esters or partial esters of fatty acids containing 6 to 22 carbon atoms such as caproic, octoic, lauric, palmitic, stearic, linoleic, etc., to help avoid agglomeration of the powder. Normally, only a relatively small quantity of the surface active agent will be used, as for example, from about 0.1 to about 5% by weight, preferably from about 0.25 to about 1.0%, although larger quantities may be used if desired. Similarly, the stated quantity of 3-deazauridine or 3-deazacytidine may be dissolved in the liquefied propellant with the aid of a solvent such as ethanol, as described in U.S. Pat. 2,868,691, the disclosure of which is also incorporated by reference herein.

If desired, the anti-viral agent may be injected into the host in which case it would be in the form of a physiological saline solution containing from about 50 to about 200 milligrams of the agent per milliliter of solution.

It should be noted that the form in which the anti-viral agent is administered, of course, will depend upon the particular virus infection being treated. For example, if the infection is caused by influenza or other virus and has manifested itself in the respiratory tract, the preferred mode of treatment will be the described aerosol nasal spray since this would deliver most effectively the agent to the site of the infection. By the same token, the daily dosage will depend upon a number of variable factors and will have to be determined for each individual case. Generally, if the agent is administered orally or by injection, the dosage should be within the approximate range of from about 50 to 200 milligrams four times per day.

EXAMPLE I

The anti-viral agents were tested for activity using the virus-induced cytopathogenic effect (CPE) method of Sidwell et al., Applied Microbiology, 22:797–801, 1971. Briefly, the CPE procedure includes the dissolution of the anti-viral agent in a cell culture medium consisting of vitamins, amino acids, serum, buffer, penicillin, streptomycin and indicator dye in water. The virus suspended in the cell culture medium was added to an established monolayer of KB cells, and an equal volume of the anti-viral agent was then added within 15 minutes. The infected treated cells were incubated three days, and the degree of CPE on the cells was graded following microscopic examination. Controls for each experiment include cell controls (cells and cell culture medium only), virus controls (cells and virus and cell culture medium), and toxicity controls (cells and chemical and cell culture medium).

The virus rating (VR) system of Sidwell et al. described in Applied Microbiology, supra, was used to evaluate the degree of significance of CPE inhibition. A virus rating (VR) greater than 0.5 is indicative of significant anti-viral activity and a VR of less than 0.5 suggests slight anti-viral activity.

The results of the anti-viral experiments are set forth in Table I.

TABLE I

| Virus | Virus rating | |
|---|---|---|
| | Deazacytidine | Deazauridine |
| Poliovirus, type 2 | 0.2 | 0.0 |
| Rhinovirus: | | |
| Type 1A | 0.8 | 0.8 |
| Type 13 | 0.7 | 0.7 |
| Type 56 | 0.7 | 0.7 |
| Parainfluenza virus, type 3 | 0.3 | 0.3 |
| Vesicular stomatitis virus | 0.5 | 0.8 |

EXAMPLE II

Since influenza and parainfluenza viruses produce consolidation in the lung, the anti-viral agents were tested for effectivness by measuring the extent of ortho (influenza $A_2$ and B) and paramyxovirus (Sendai) hemagglutinin (HA) production in secondary cultures of CE cells (chicken embryo) during a 3-day incubation period by the procedure of Example I. The HA titer of the combined extra- and intracellular material was determined by adding to the material an equal volume of 0.5% guinea pig red blood cells in phosphate buffered saline (0.02M $PO_4$, pH 7.2; 0.15M NaCl). The HA titer was recorded 45 minutes after incubation at room temperature. The results of the hemagglutinin tests are set forth in Table II.

TABLE II

Comparative efficacy of 3-deazacytidine and 3-deazauridine on hemagglutinin production in ortho- or paramyxovirus-infected chicken embryo cell cultures

| | Hemagglutinin, titer/0.1 ml. | | | | | |
|---|---|---|---|---|---|---|
| | Deazacytidine | | | Deazauridine | | |
| Compound concentration (µ/ml.) | Influenza $A_2$ | Influenza B | Parainfluenza, type 1 | Influenza $A_2$ | Influenza B | Parainfluenza, type 1 |
| 1,000 | 1:4 | <1:4 | 1:2 | 1:4 | <1:4 | 1:4 |
| 320 | 1:4 | <1:4 | 1:2 | 1:4 | <1:4 | 1:4 |
| 100 | 1:4 | 1:4 | 1:8 | 1:4 | 1:4 | 1:16 |
| 32 | 1:4 | 1:4 | 1:8 | 1:8 | 1:4 | 1:16 |
| 10 | 1:8 | 1:4 | 1:16 | 1:8 | 1:8 | 1:16 |
| 3.2 | 1:16 | 1:8 | 1:16 | 1:8 | 1:16 | 1:16 |
| 1.0 | 1:16 | 1:8 | 1:16 | 1:16 | 1:16 | 1:32 |
| 0 | 1:16 | 1:16 | 1:32 | 1:16 | 1:16 | 1:32 |

Other anti-viral experiments have also been performed using the general procedures set forth in Example I. 3-deazacytidine, at a virus dose of 100 ($CCID_{50}$)/cup, showed a VR of 0.3 against parinfluenza type 3 virus, a VR of 0.42 against Herpes type 1 and 0.68 against Rhino type 13 [virus dose of 320 (CCID$_{50}$)/cup]. 3-diazauridine, at a virus dose of 100 (CCID$_{50}$)/cup, showed a VR of 0.12 against parinfluenza type 3, and 0.42 against Herpes type 1.

EXAMPLE III

In the following example, the *in vivo* anti-viral activity of 3-deazacytidine was demonstrated.

The lungs removed from 4 mice of each group were homogenized in 15 ml. of phosphate buffered saline (PBS; pH 7.2, 0.02$M$, PO$_4$, 0.15$M$ NaCl) for 3 minutes in Sorvall Omni-Mixer. The homogenized lung preparation was centrifuged at 1500 r.p.m. for 15 minutes. A two-fold dilution of the supernate was made in PBS and equal volume of 0.5% PBS-washed guinea pig red blood cells was added into each tube. The extent of red cell agglutination at the end of 45 minute incubation at room temperature was recorded and finally expressed as hemagglutinin titer per ml. The results are shown in Table III.

TABLE III

Effect of 3-deazacytidine on influenza A$_2$ virus-induced lung infections in mice Host: 13–14 g. female Swiss mice  
Route of virus inoculation: Aerosol  
Virus dose: 3.2 LD$_{50}$  
Observation period: 21 days  
Drug vehicle: Physiological saline  
Route of drug inoculation: Intraperitoneal  
Start of treatment relative to virus inoculation: 4 hr. pre  
No. of treatments/day: Two  
Treatment duration: 9 days

| 3-deazacytidine dose (mg./kg./day) | Average lung consolidation** | Percent inhibition in lung consolidation* | Hemagglutinin, titer/ml.*** |
|---|---|---|---|
| 0 | 3.6 | 0 | 1:64 |
| 500 | 2.5 | 31 | 1:32 |
| 1,000 | 2.4 | 34 | 1:16 |

*Averages obtained from 4 mice sacrificed on 13th day post-infection.  
**A scale of 0–4 used to denote lung consolidation from 0–100%.  
***Lungs from each group were homogenized in 15 ml. of phosphate buffered saline (PBS) and used for hemagglutinin assay using 0.5% g-pig erythrocytes.

It will be appreciated from the foregoing that the 3-deazapyrimidine nucleosides have demonstrated a spectrum of anti-RNA viral activity and are particularly effective against Rhino and influenza viruses. Relative cytotoxicity studies indicate slight to moderate cytotoxicity in cell culture, with 1000 μg./ml. producing some cell detachment. At a concentration of 320 μg./ml., 3-deazacytidine induced slight cytoplasmic granularity, as did 3-deazauridine at concentrations down to 32 μg./ml., although altered cell function and viability were not observed. The nucleosides are also water soluble to a significantly greater extent than Ara-A or IDU, thus allowing for more uniform preparation if administered as a solution.

In animal toxicity experiments, both 3-deazauridine and 3-deazacytidine were found to be relatively nontoxic. Young adult mice, inoculated intraperitoneally once daily for 9 days, tolerated 400 mg./kg./day of 3-deazauridine with no major clinical signs of toxicity exhibited. Similar results were seen using dosages as high as 1000 mg./kg./day of 3-deazacytidine.

We claim:

1. An anti-viral composition adapted for nasal ingestation comprising from about 0.001 to about 5.0% by weight, based on the total weight of said composition, of a compound of the structure:

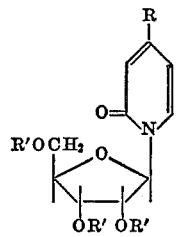

wherein R is OH or NH$_2$, and R' is H or C$_1$ to C$_{20}$ acyl, suspended in a liquefied propellant.

2. The composition of claim 1 in which said compound is 3-deazacytidine or 3-deazauridine.

3. The composition of claim 1 in which said compound is a powder having a particle size not greater than about 25 microns.

4. The composition of claim 3 in which the particle size is from about 0.5 to about 4 microns.

5. The composition of claim 3 in which said composition includes about 0.1 to about 5% by weight, based on total weight, of a surface active agent to help avoid agglomeration of said powder.

6. A process of inhibiting the development of RNA virus infections comprising contacting such a virus infection in cell culture with a composition containing as the active component at least about 0.001 percent by weight, based on the total weight of the composition, of a compound of the structure:

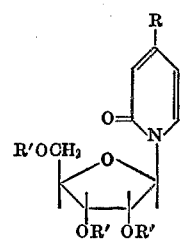

wherein R is OH or NH$_2$, and R' is H or C$_1$ to C$_{20}$ acyl.

7. The process of claim 6 in which said compound is 3-deazacytidine or 3-deazauridine.

8. A process of inhibiting the development of RNA virus infections comprising contacting such as virus infection in warm blooded animals with a composition containing as the active component at least about 0.001 percent by weight, based on the total weight of the composition, of a compound of the structure:

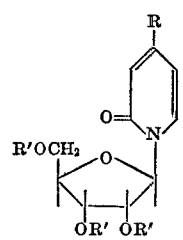

wherein R is OH or NH$_2$, and R' is H or C, to C$_{20}$ acyl.

9. The process of claim 8 in which the composition is in the form of a physiological saline solution.

10. The process of claim 8 in which said composition is in the form of an aerosol nasal spray.

11. The process of claim 8 in which said virus infection is contacted with a composition containing from about 0.001 to about 5.0% by weight based on the total weight of the composition, of said compound.

12. The process of claim 11 in which said compound is 3-deazacytidine or 3-deazauridine.

13. A process of inhibiting the development of Herpes type 1 virus infections comprising contacting such virus infection in cell culture with a composition containing as the active compoent at least about 0.001 percent by weight, based on the total weight of the composition, of a compound of the structure:

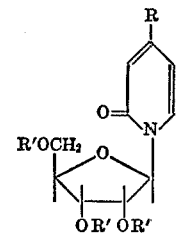

wherein R is OH or $NH_2$, and R' is H or $C_1$ to $C_{20}$ acyl.

14. The process of claim 13 in which said compound is 3-deazacytidine or 3-deazauridine.

15. A process of inhibiting the development of Herpes type 1 virus infections comprising contacting such virus infection in warm blooded animals with a composition containing as the active component at least about 0.001 percent by weight, based on the total weight of the composition, of a compound of the structure:

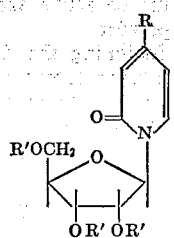

wherein R is OH or $NH_2$, and R' is H or $C_1$ to $C_{20}$ acyl.

16. The process of claim 15 in which the composition is in the form of a physiological saline solution.

17. The process of claim 15 in which said composition is in the form of an aerosol nasal spray.

18. The process of claim 15 in which said virus infection is contacted with a composition containing from about 0.001 to about 5.0 percent by weight, based on the total weight of the composition, of said compound.

19. The process of claim 18 in which said compound is 3-deazacytidine or 3-deazauridine.

References Cited
UNITED STATES PATENTS
3,705,147   12/1972   Robinse et al. _____ 424—180

RICHARD L. HUFF, Primary Examiner